(12) United States Patent
Aouad (10) Patent No.: US 9,590,233 B2
(45) Date of Patent: Mar. 7, 2017

(54) METHOD OF MAKING A CATHODE

(71) Applicant: DURACELL U.S. OPERATIONS, INC., Wilmington, DE (US)

(72) Inventor: Yousef Georges Aouad, Cincinnati, OH (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 352 days.

(21) Appl. No.: 14/074,840

(22) Filed: Nov. 8, 2013

(65) Prior Publication Data

US 2014/0298645 A1 Oct. 9, 2014

Related U.S. Application Data (60) Provisional application No. 61/808,820, filed on Apr. 5, 2013.

(51) Int. Cl.
| | | |
|---|---|---|
| H01M 4/04 | (2006.01) | |
| H01M 4/62 | (2006.01) | |
| H01M 4/75 | (2006.01) | |
| H01M 4/02 | (2006.01) | |
| H01M 4/78 | (2006.01) | |
| H01M 4/08 | (2006.01) | |
| H01M 4/50 | (2010.01) | |

(52) U.S. Cl.
CPC ......... *H01M 4/0411* (2013.01); *H01M 4/04* (2013.01); *H01M 4/0471* (2013.01); *H01M 4/622* (2013.01); *H01M 4/75* (2013.01); *H01M 4/02* (2013.01); *H01M 4/08* (2013.01); *H01M 4/50* (2013.01); *H01M 4/621* (2013.01); *H01M 4/625* (2013.01); *H01M 4/78* (2013.01); *Y10T 29/49108* (2015.01)

(58) Field of Classification Search
CPC .......... H01M 4/50; H01M 4/621; H01M 4/75; H01M 4/78; H01M 4/0411
USPC ........................................................ 29/623.1
See application file for complete search history.

(56) References Cited

U.S. PATENT DOCUMENTS

| | | |
|---|---|---|
| 4,386,019 A | 5/1983 | Kaun et al. |
| 4,589,197 A | 5/1986 | North |
| 4,818,643 A | 4/1989 | Cook et al. |

(Continued)

FOREIGN PATENT DOCUMENTS

| | | |
|---|---|---|
| CN | 1430797 A | 7/2003 |
| DE | 102011109854 A1 | 2/2013 |

(Continued)

OTHER PUBLICATIONS

PCT International Search Report with Written Opinion in corresponding Int'l appln. PCT/US2014/032444 dated Jun. 24, 2014.

(Continued)

*Primary Examiner* — Basia Ridley
*Assistant Examiner* — James Erwin
(74) *Attorney, Agent, or Firm* — Marshall, Gerstein & Borun LLP (57) ABSTRACT

A battery cathode is made by mixing electrochemically active cathode material, graphite, water and an aqueous based binder to provide a mixture. The mixture is extruded continuously into a cathode. Water is then removed from the cathode. The cathode is cut into individual pieces.

22 Claims, 3 Drawing Sheets

(56) References Cited

U.S. PATENT DOCUMENTS

| | | | |
|---|---|---|---|
| 5,013,619 A | 5/1991 | Cook et al. | |
| 5,219,685 A | 6/1993 | Taniguchi et al. | |
| 5,316,556 A | 5/1994 | Morris | |
| 5,489,493 A | 2/1996 | Urry | |
| 5,554,464 A | 9/1996 | Stempin et al. | |
| 5,593,462 A | 1/1997 | Gueguen et al. | |
| 5,677,080 A * | 10/1997 | Chen | H01M 10/04 429/166 |
| 5,698,147 A | 12/1997 | Chern et al. | |
| 5,725,822 A | 3/1998 | Keller et al. | |
| 5,749,927 A | 5/1998 | Chern et al. | |
| 6,207,322 B1 | 3/2001 | Kelsey et al. | |
| 6,284,192 B1 | 9/2001 | Coonan et al. | |
| 6,342,317 B1 | 1/2002 | Patel et al. | |
| 6,368,365 B1 | 4/2002 | Chi et al. | |
| 6,399,246 B1 | 6/2002 | Vandayburg et al. | |
| 6,428,585 B1 | 8/2002 | Coetzer | |
| 6,479,188 B1 | 11/2002 | Chi et al. | |
| 6,503,432 B1 | 1/2003 | Barton et al. | |
| 6,589,299 B2 | 7/2003 | Missling et al. | |
| 6,749,799 B2 | 6/2004 | Crumm et al. | |
| 6,939,383 B2 | 9/2005 | Eastin et al. | |
| 6,986,967 B2 | 1/2006 | Barton et al. | |
| 7,238,448 B1 | 7/2007 | Kaplan et al. | |
| 7,651,647 B1 | 1/2010 | Strange et al. | |
| 7,700,018 B2 | 4/2010 | Lavoie et al. | |
| 7,700,019 B2 | 4/2010 | Lavoie et al. | |
| 7,758,782 B2 | 7/2010 | Fehrmann et al. | |
| 7,855,017 B1 * | 12/2010 | Snyder | H01M 6/18 429/232 |
| 8,409,750 B2 | 4/2013 | Kwon et al. | |
| 2004/0119194 A1 * | 6/2004 | Aladjov | B29C 47/0004 264/176.1 |
| 2006/0099505 A1 * | 5/2006 | Fujino | H01M 4/04 429/217 |
| 2006/0166093 A1 | 7/2006 | Zaghib et al. | |
| 2007/0108647 A1 | 5/2007 | Zuberi et al. | |
| 2008/0179782 A1 | 7/2008 | Liu et al. | |
| 2009/0136834 A1 * | 5/2009 | Coowar | H01M 2/0267 429/127 |
| 2009/0226805 A1 * | 9/2009 | Yoppolo | H01M 2/0202 429/163 |
| 2010/0009257 A1 * | 1/2010 | Kang | H01M 4/62 429/215 |
| 2012/0202114 A1 * | 8/2012 | Madray | H01M 4/0404 429/211 |
| 2012/0276447 A1 * | 11/2012 | Nishinaka | H01M 4/131 429/211 |

FOREIGN PATENT DOCUMENTS

| | | |
|---|---|---|
| GB | 1268238 | 3/1972 |
| GB | 2171684 A | 9/1986 |
| JP | 2012033373 A | 2/2012 |
| JP | 2013504846 A | 2/2013 |

OTHER PUBLICATIONS

Official Notice of Rejection (with English translation), Japanese patent application No. 2016-506356, mailed Aug. 30, 2016.

Office Action, Chinese patent application No. 201480017378.0, mailing date Nov. 1, 2016.

* cited by examiner

METHOD OF MAKING A CATHODE

FIELD OF THE INVENTION

The invention relates to a method of making a cathode for a battery and more particularly to a method for making a battery.

BACKGROUND OF THE INVENTION

Electrochemical cells, or batteries, are commonly used as electrical energy sources. A battery contains a negative electrode, typically called the anode, and a positive electrode, typically called the cathode. The anode contains an active material that can be oxidized. The cathode contains or consumes an active material that can be reduced. The anode active material is capable of reducing the cathode active material. A separator is disposed between the anode and cathode. These components are disposed in a metal can.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

There is a need to improve the method to make cathodes. One typical method to make cathodes is to press the cathodes into pellets. A series of pellets are then stacked and inserted into a can to form the cathode. This technique requires numerous production steps.

There have been prior attempts to extrude cathodes. However, these attempts require the support of an additional structure in the extrusion process to provide the cathode with the integrity needed for further assembly into a battery.

SUMMARY OF THE INVENTION

The invention is directed to a method of making a battery cathode. The method includes the step of mixing electrochemically active cathode material, graphite, water and an aqueous based binder to provide a mixture. The mixture is extruded continuously into a cathode. Water is removed from the cathode. The cathode is cut into individual cathodes.

The invention is directed to a method of making a battery. The method includes the step of making a cathode by mixing electrochemically active cathode material, graphite, water and an aqueous based binder to provide a mixture. The mixture is extruded continuously into a cathode. Water is removed from the cathode. The cathode is cut into individual cathodes. The cathode is inserted in a can. A separator is inserted in the can. A current collector is inserted in the can. An anode is inserted in the can. An electrolyte is inserted in the can. The can is sealed.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Figure 1:
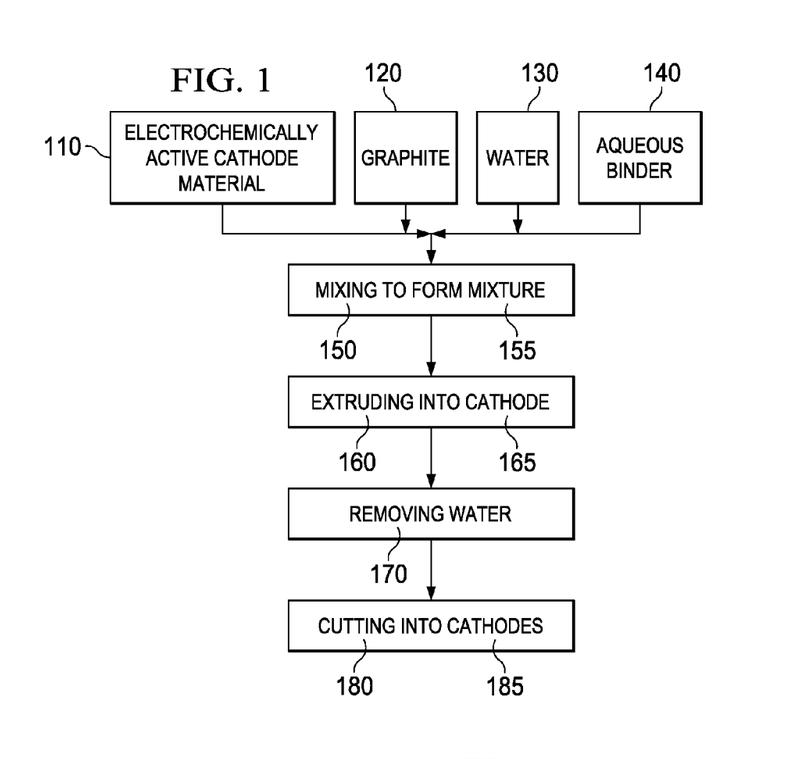
FIG. 1 shows a process for cathode production.

Referring now to FIG. 1 there is shown a process for cathode production. The process combines electrochemically active cathode material 110, graphite 120, water 130 and an aqueous binder 140 in a mixing step 150 to form a mixture 155. The mixture 155 is then extruded continuously 160 into a cathode 165. Water is removed 170 from the cathode 165. The cathode 165 is cut 180 to form individual cathodes or pieces 185.

Electrochemically active cathode material 110, graphite 120, water 130 and aqueous binder 140 are inserted in a mixing device and mixed to form a mixture. The aqueous binder 140 may be in either solution form or in powder form.

The electrochemically active cathode material 110 may include manganese oxide, manganese dioxide, electrolytic manganese dioxide (EMD), chemical manganese dioxide (CMD), high power electrolytic manganese dioxide (HP EMD), lambda manganese dioxide, and mixtures thereof. Other electrochemically active cathode materials include, but are not limited to, silver oxide, nickel oxide, nickel oxyhydroxide, copper oxide, bismuth oxide, high-valence nickel, alloys thereof, and mixtures thereof. The nickel oxide can include nickel oxyhydroxide, cobalt oxyhydroxide-coated nickel oxyhydroxide, delithiated layered lithium nickel oxide, and combinations thereof. The nickel oxyhydroxide can include beta-nickel oxyhydroxide, gamma-nickel oxyhydroxide, and/or intergrowths of beta-nickel oxyhydroxide and/or gamma-nickel oxyhydroxide. The cobalt oxyhydroxide-coated nickel oxyhydroxide can include cobalt oxyhydroxide-coated beta-nickel oxyhydroxide, cobalt oxyhydroxide-coated gamma-nickel oxyhydroxide, and/or cobalt oxyhydroxide-coated intergrowths of beta-nickel Oxyhydroxide and gamma-nickel oxyhydroxide. The nickel oxide can include a partially delithiated layered nickel oxide having the general chemical formula $Li_{1-x}H_yNiO_2$, wherein $0.1<x<0.9$ and $0.1<y<0.9$. The high-valence nickel may, for example, include tetravalent nickel.

A preferred electrochemically active cathode material 110 is manganese dioxide, having a purity of at least about 91 percent by weight. Electrolytic manganese dioxide (EMD) is a preferred form of manganese dioxide for electrochemical cells because of its high density and since it is conveniently obtained at high purity by electrolytic methods. Chemical manganese dioxide (CMD), a chemically synthesized manganese dioxide, has also been used as electrochemically active cathode material in electrochemical cells including alkaline cells and heavy-duty cells.

EMD is typically manufactured from direct electrolysis of a bath of manganese sulfate and sulfuric acid. Processes for the manufacture of EMD and its properties appear in Batteries, edited by Karl V. Kordesch, Marcel Dekker, Inc., New York, Vol. 1, (1974), p. 433-488. CMD is typically made by a process known in the art as the "Sedema process," a chemical process disclosed by U.S. Pat. No. 2,956,860 (Welsh). Battery-grade $MnO_2$ may be produced via the Sedema process by employing the reaction mixture of $MnSO_4$ and an alkali metal chlorate, preferably $NaClO_3$. Distributors of manganese dioxides include Tronox, Erachem, Tosoh, Delta Manganese, and Xiangtan.

In batteries where very low or no cell distortion is required, high power (HP) EMD may be used. Preferably, the HP EMD has an open circuit voltage (OCV) of at least 1.635. A suitable HP EMD is commercially available from Tronox, under the trade name High Drain.

Graphite is included in the cathode to allow the electrons to flow through the cathode. Expanded graphite and natural graphite may be used. It is preferred that the amount of graphite in the cathode is relatively low, e.g., less than 8%, or even less than 6%, for example 2% to 5%. A lower graphite level enables inclusion of a higher level of active material within the cathode without increasing the volume of the cell or reducing the void volume (which must be maintained at or above a certain level to prevent internal pressure from rising too high as gas is generated within the cell). A suitable expanded graphite can be obtained, for example, from Timcal. Other suitable graphites include graphene and nanofiber graphite.

It is generally preferred that the cathode be substantially free of unexpanded graphite. While unexpanded graphite particles provide lubricity to the cathode forming equipment, this type of graphite is significantly less conductive than expanded graphite, and thus it is necessary to use more in order to obtain the same cathode conductivity. While not preferred, the cathode may include low levels of unexpanded graphite, however this will compromise the reduction in graphite concentration that can be obtained while maintaining a particular cathode conductivity.

It is preferred that the amount of water in the mixture range from 10% to 20%. The amount of water may be altered to allow for ease of extrusion of the mixture.

The aqueous binder 140 is to be stable in the presence of the electrochemically active cathode material 110. The aqueous binder 140 is to have a minimum swelling behavior in water. The minimum swelling behavior in water minimizes the volume of the extruded cathode providing a relatively dense cathode. In addition, minimizing the amount of swelling of the aqueous binder 140 maximizes the amount of electrochemically active cathode material 110 in the cathode. A preferred aqueous binder 140 is hydroxypropylmethylcellulose (HPMC). Other aqueous binders 140 include polyacrylates and PVOH. Preferably, the binder has a swelling of no more than about 10%, more preferably no more than about 5%, most preferably no more than about 3% in water.

It is preferred that the amount of aqueous binder in the cathode is relatively low, e.g., less than 3%, preferably less than 2%, preferably from 0.2% to 2%, more preferably from 0.4% to 1.2%. A lower aqueous binder level enables inclusion of a higher level of active material within the cathode.

The mixture may also include other additives. Examples of other cathode additives are described in, for example, U.S. Pat. Nos. 5,698,315, 5,919,598, and 5,997,775 and U.S. application Ser. No. 10/765,569. The mixture may also include additional materials. In the presence of these additional materials, the binding capability of the binder should not be adversely affected or inhibited. For example, the cathode may include an electrolyte component such as potassium hydroxide. If potassium hydroxide is included in the cathode the potassium hydroxide concentration should not exceed 7% otherwise the binder will lose its binding capability. The binder is insoluble in the potassium hydroxide at concentrations less than 7%. The cathode may also include a surfactant. The surfactants will need to be compatible with the binder so as to not adversely affect the binding capability. Examples of suitable surfactants include but are not limited to anionic surfactants, amphoteric surfactants, and combinations thereof.

One non-limiting example of suitable surfactants can include a diphenyl sulfonate or derivative thereof. In one embodiment, the surfactant comprises an anionic diphenyl sulfonate surfactant or a hydrocarhyl substituted derivative thereof where the hydrocarbyl group contains 1 to about 24 and preferably 1 to about 12 carbon atoms. Specific examples include alkali metal alkyl diphenyl oxide disulfonates such as sodium hexyldiphenyioxide disulfonate, sodium decyldiphenyloxide disulfonate, dodecyldiphenyloxide disulfonic acid, sodium dodecyldiphenyloxide disulfonate, N-decyldiphenyloxide disulfonate, sodium n-decyldiphenyloxide disulfonate and sodium n-hexadecyldiphenyloxide disulfonate. Diphenlysulfonate surfactants are commercially available from Dow under the general trade designation "Dowfax," and specifically include Dowfax C6L, C10L, 2AO, 2A1, 2A1-D, 2EP, 3BO, 3B2, 3B2-D, 2000, 8390, and 8390-D.

Examples of anionic surfactants are chlorine bleach stable, alkali soluble surfactants. In one embodiment the anionic surfactants are not soluble above 5% KOH, or not soluble in 30% KOH.

Suitable diphenyl sulfonate surfactants can have the general structure as shown below where the R leaving group can be varied. Examples of different leaving groups include: Dowfax C6L has R=Linear Hexyl(C6); DowFax 3B2has R=Linear Decyl(C10); DowFax C10L has R=Linear Decyl (C10), higher sulfonation; DowFax 2A 1 has R=Linear dodecyl (C12); and DowFax 8390 has R=Linear hexadecyl (C16).

Another non-limiting example of a suitable surfactant includes an amphoteric surfactant. The term "amphoteric" as used herein, means a compound which exhibits cationic behaviour at low pH and anionic behaviour at high pH. At intermediate pH, called the isoelectric point, the compound bears both positive and negative charges i.e. it is a dipolar ion. In one embodiment, the amphoteric surfactants used herein are soluble in 30% KOH solution but demonstrate little to no surface activity in such a solution.

In one example. the amphoteric surfactant has the general formula of:

Wherein R=C16, C12, or 2-ethylhexyl. Non-limiting examples of commercially available amphoteric surfactants include: Amphoteric LH, Amphoteric 16, Amphoteric 12, and Amphoteric 400, all commercially available from Air Products.

The cathode may also include combinations of other polymers and binders.

Figure 2:
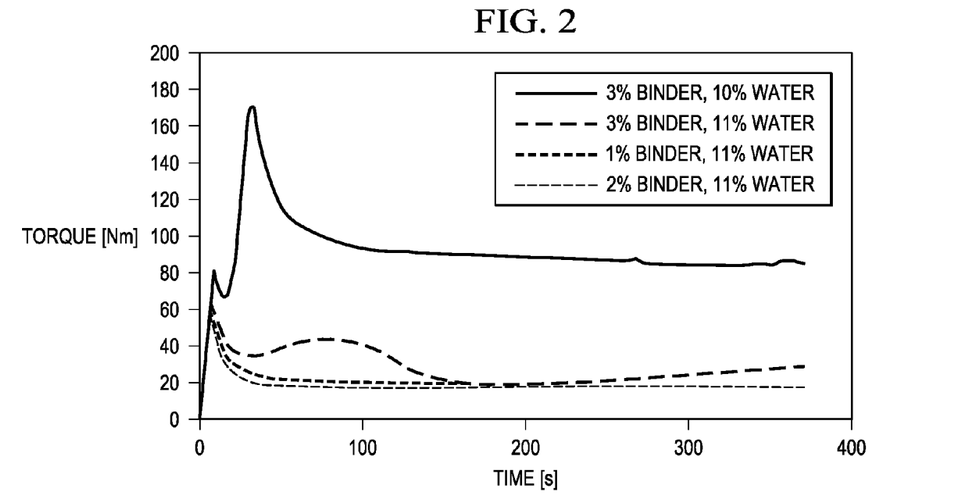
FIG. 2 shows a plastogram of the mixture to be extruded.

Prior to being extruded the properties of the cathode may be defined. The mixture may be placed in a Brabender Plastograph EC Plus N50 Kneader torque rheometer and kneaded at 25 rpm. The kneader jacket temperature is kept constant at 20 C. Referring now to FIG. 2, there is shown a plastogram of the cathode mixture prior to extrusion. The plastogram shows that cathode mixture has at least one peak ranging from 20 N-m to 200 N-m occurring between 1 sec and 10 sec. The cathode mixture can also have a second peak occurring in time after the first peak and having a peak ranging from 20 to 140 N-m.

The mixture 155 is extruded continuously 160 into a cathode 165. the extruder may be a single screw, twin screw or other variety extruder. The extruder can be outfitted with a vacuum chamber to de-aerate the mixture helping to densify the mixture before it exits the extruder die. The porosity of the extruded cathode 165 can be adjusted by retaining air, reducing extrusion pressure, adding more water and other methods.

Water is removed 170 from the cathode 165. Water may be removed by heating the cathode in a dryer. The cathode may be heated in a dryer at a temperature between about 30° C. and 500° C. Preferably, at least 50% by weight of the water is removed from the cathode by heating.

The cathode 165 is cut 180 to form individual cathodes or pieces 185. The cathode 165 may be cut prior to removing the water, after removing the water or both. The cathode 165 may be cut to a first length prior to removing the water and cut to a final length after the water has been removed.

The ratio of electrochemically active cathode material 110 to graphite 120 ranges from 99:1 to 90:10. The ratio of electrochemically active cathode material 110 and graphite 120 to aqueous binder 140 ranges from 99.5:0.5 to 97:3. The ratio of electrochemically active cathode material 110, graphite 120, and aqueous binder 140 to water 130 ranges from 89:10.5 to 80:20.

The amount of electrochemically active cathode material within the cathode may be referred to as the cathode loading. The loading of the cathode may vary depending upon the electrochemically active cathode material used within, and the cell size of, the battery. For example, AA batteries with a manganese dioxide electrochemically active cathode material may have a cathode loading of at least 10.0 grams of manganese dioxide. The cathode loading may be, for example, at least about 10.5 grams of manganese dioxide. The cathode loading may be, for example, between about 10.7 grams and about 11.5 grams of manganese dioxide. The cathode loading may be from about 10.7 grams and about 11.0 grams of manganese dioxide. The cathode loading may be from about 10.8 grams and about 11.2 grams of manganese dioxide. The cathode loading may be from about 10.9 grams and about 11.5 grams of manganese dioxide. For a AAA battery, the cathode loading may be from about 4.0 grams and about 6.0 grams of manganese dioxide. For a AAAA battery, the cathode loading may be from about 2.0 grams and about 3.0 grams of manganese dioxide. For a C battery, the cathode loading may be from about 25.0 grams and about 29.0 grams of manganese dioxide. For a D battery, the cathode loading may be from about 54.0 grams and about 70.0 grams of manganese dioxide.

The extruded cathode will have a sufficient dry density to enable good conductivity. The cathode dry density is preferably between about 2.0 g/cm$^2$ and 3.5 g/cm$^2$, more preferably between about 2.4 g/cm$^2$ and 3.3 g/cm2.

The cathode will have sufficient integrity to withstand the handling and insertion into a can. The cathode integrity may defined by the cathodes dry bending strength. The cathode dry bending strength is preferably at least about 0.5 N/mm$^2$ and more preferably at least about 1.0 N/mm$^2$ and most preferably at least about 1.5 N/mm$^2$.

Ideally the cathode will experience relatively minimal shrinkage between extrusion and drying. The amount of linear cathode shrinkage is preferably less than about 5.0%. The amount of cross-sectional cathode shrinkage is preferably less than about 5.0%

Figure 3:
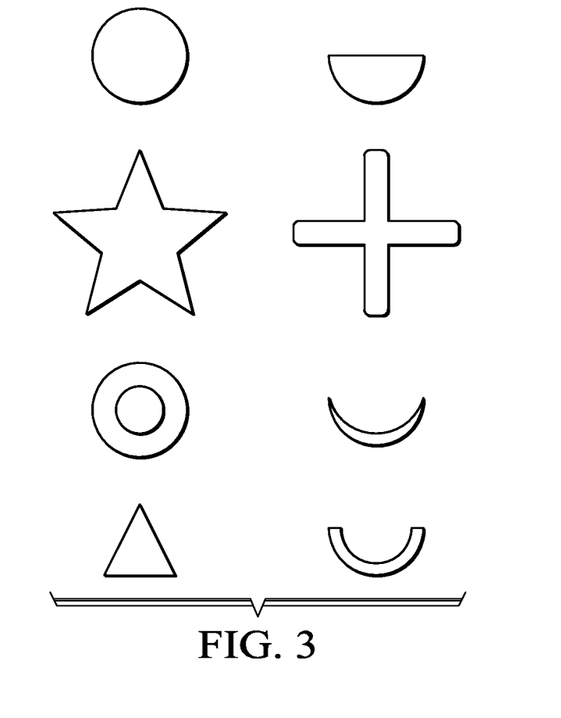
FIG. 3 shows cathode cross-sectional configurations.

Referring now to FIG. 3 there is shown cathode cross-sectional configurations. The extruder may be equipped with the appropriate die to produce the cathode cross-sectional configurations shown in FIG. 3. The cross-sectional configurations shown include circular, semicircular, star, multi-lobed, crescent, pie, partial ring and annulus.

The following are examples of cathodes made according to the present invention.

EXAMPLE 1

In a 40 litre jacketed Sigma-blade double arm kneader, 19.2 kg of EMD is added followed by 0.8 kg of graphite. To these powders, 3445 g of a 3% binder solution of SE-Tylose MOB20000P1 is added. The kneader is turned on, and the material is mixed for one full hour while maintaining the temperature at 20° C. The resultant material is placed in a ram extruder model KP80A manufactured by ECT, Germany. The material is extruded through a die having an outer diameter of 14.5 mm and an inner diameter of 8.45 mm. The ram extruder is operated at a piston speed ranging from 10 to 50 cm/min which corresponded to an extruded tube velocity range of 5-28 m/min. The extruded tube contains 0.52% binder by weight of dry components and 14% water by weight.

EXAMPLE 2

In a 40 litre jacketed Sigma-blade double arm kneader, 20 kg of powder is added. The powder consists of 8% by weight graphite with the balance being EMD. To these powders, 4355 g of a 2.4% binder solution of SE-Tylose MOB20000P1 is added. The kneader is turned on, and the material is mixed for one full hour while maintaining the temperature at 20° C. The resultant material is then processed on an 80 mm single screw extruder manufactured by Haendle, Germany. The material is extruded through a die having outer diameter of 13.2 mm and an inner diameter of 7.7 mm. The screw is operated at a speed from about 5 to 34 rpm which corresponded to 750 g-6245 g/min and to a tube velocity ranging from 3-24.6 m/min. The extruded cathode contains 0.6% binder by weight of dry components and 13.75% water by weight.

The mixture may undergo a conditioning step prior to being extruded into a cathode. The mixture may be conditioned to increase the compaction and/or density by extruding the mixture prior to extruding the mixture into a cathode.

Figure 4:
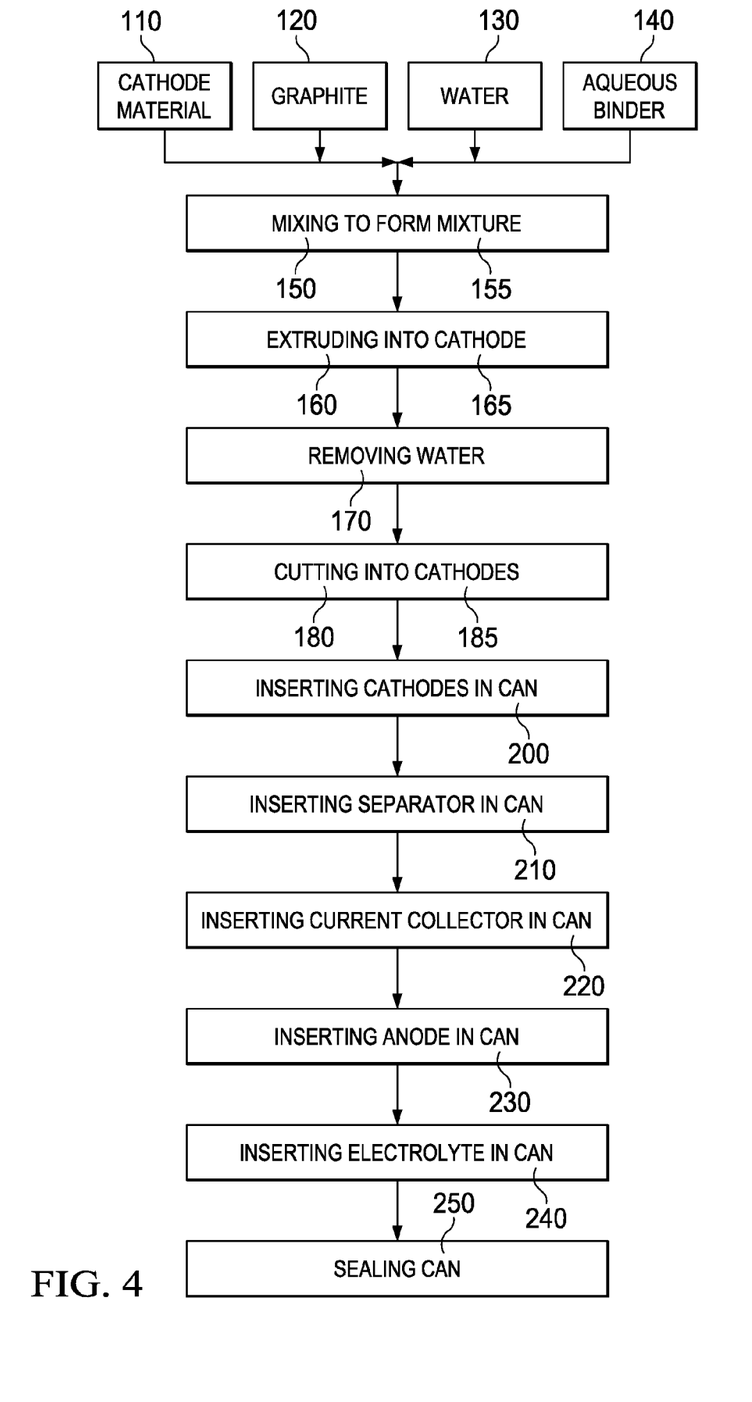
FIG. 4 shows a process for battery production.

Referring now to FIG. 4 there is shown a process for battery production. To make the cathode the process combines electrochemically active cathode material 110, graphite 120, water 130 and an aqueous binder 140 in a mixing step 150 to form a mixture 155. The mixture 155 is then extruded continuously 160 into a cathode 165. Water is removed 170 from the cathode 165. The cathode 165 is cut 180 to form individual cathodes 185.

Electrochemically active cathode material 110, graphite 120, water 130 and aqueous binder 140 are inserted in a mixing device and mixed to form a mixture. The aqueous binder 140 may be in either solution form or in powder form.

The electrochemically active cathode material 110 may include manganese oxide, manganese dioxide, electrolytic manganese dioxide (EMD), chemical manganese dioxide (CMD), high power electrolytic manganese dioxide (HP EMD), lambda manganese dioxide, and mixtures thereof. Other electrochemically active cathode materials include, but are not limited to, silver oxide, nickel oxide, nickel oxyhydroxide, copper oxide, bismuth oxide, high-valence nickel, alloys thereof, and mixtures thereof. The nickel oxide can include nickel oxyhydroxide, cobalt oxyhydroxide-coated nickel oxyhydroxide, delithiated layered lithium nickel oxide, and combinations thereof. The nickel oxyhydroxide can include beta-nickel oxyhydroxide, gamma-nickel oxyhydroxide, and/or intergrowths of beta-nickel oxyhydroxide and/or gamma-nickel oxyhydroxide. The cobalt oxyhydroxide-coated nickel oxyhydroxide can include cobalt oxyhydroxide-coated beta-nickel oxyhydroxide, cobalt oxyhydroxide-coated gamma-nickel oxyhydroxide, and/or cobalt oxyhydroxide-coated intergrowths of beta-nickel Oxyhydroxide and gamma-nickel oxyhydroxide. The nickel oxide can include a partially delithiated layered nickel oxide having the general chemical formula $Li_{1-x}H_yNiO_2$, wherein $0.1<x<0.9$ and $0.1<y<0.9$. The high-valence nickel may, for example, include tetravalent nickel.

A preferred electrochemically active cathode material 110 is manganese dioxide, having a purity of at least about 91 percent by weight. Electrolytic manganese dioxide (EMD) is a preferred form of manganese dioxide for electrochemical cells because of its high density and since it is conveniently obtained at high purity by electrolytic methods. Chemical manganese dioxide (CMD), a chemically synthesized manganese dioxide, has also been used as electrochemically active cathode material in electrochemical cells including alkaline cells and heavy-duty cells.

EMD is typically manufactured from direct electrolysis of a bath of manganese sulfate and sulfuric acid. Processes for the manufacture of EMD and its properties appear in Batteries, edited by Karl V. Kordesch, Marcel Dekker, Inc., New York, Vol. 1, (1974), p. 433-488. CMD is typically made by a process known in the art as the "Sedema process," a chemical process disclosed by U.S. Pat. No. 2,956,860 (Welsh). Battery-grade $MnO_2$ may be produced via the Sedema process by employing the reaction mixture of $MnSO_4$ and an alkali metal chlorate, preferably $NaClO_3$. Distributors of manganese dioxides include Tronox, Erachem, Tosoh, Delta Manganese, and Xiangtan.

In batteries where very low or no cell distortion is required, high power (HP) EMD may be used. Preferably, the HP EMD has an open circuit voltage (OCV) of at least 1.635. A suitable HP EMD is commercially available from Tronox, under the trade name High Drain.

Graphite is included in the cathode to allow the electrons to flow through the cathode. Expanded graphite and natural graphite may be used. It is preferred that the amount of graphite in the cathode is relatively low, e.g., less than 8%, or even less than 6%, for example 2% to 5%. A lower graphite level enables inclusion of a higher level of active material within the cathode without increasing the volume of the cell or reducing the void volume (which must be maintained at or above a certain level to prevent internal pressure from rising too high as gas is generated within the cell). A suitable expanded graphite can be obtained, for example, from Timcal. Other suitable graphites include graphene and nanofiber graphite.

It is generally preferred that the cathode be substantially free of unexpanded graphite. While unexpanded graphite particles provide lubricity to the cathode forming equipment, this type of graphite is significantly less conductive than expanded graphite, and thus it is necessary to use more in order to obtain the same cathode conductivity. While not preferred, the cathode may include low levels of unexpanded graphite, however this will compromise the reduction in graphite concentration that can be obtained while maintaining a particular cathode conductivity.

It is preferred that the amount of water in the mixture range from 10% to 20%. The amount of water may be altered to allow for ease of extrusion of the mixture.

The aqueous binder 140 is to be stable in the presence of the electrochemically active cathode material 110. The aqueous binder 140 is to have a minimum swelling behavior in water. The minimum swelling behavior in water minimizes the volume of the extruded cathode providing a relatively dense cathode. In addition, minimizing the amount of swelling of the aqueous binder 140 maximizes the amount of electrochemically active cathode material 110 in the cathode. A preferred aqueous binder 140 is hydroxypropylmethylcellulose (HPMC). Other aqueous binders 140 include polyacrylates and PVOH.

It is preferred that the amount of aqueous binder in the cathode is relatively low, e.g., less than 3%, preferably less than 2%, preferably from 0.2% to 2%, more preferably from 0.4% to 1.2%. A lower aqueous binder level enables inclusion of a higher level of active material within the cathode.

The mixture may also include other additives. Examples of other cathode additives are described in, for example, U.S. Pat. Nos. 5,698,315, 5,919,598, and 5,997,775 and U.S. application Ser. No. 10/765,569. The mixture may also include additional materials. In the presence of these additional materials, the binding capability of the binder should not be adversely affected or inhibited. For example, the cathode may include an electrolyte component such as potassium hydroxide. If potassium hydroxide is included in the cathode the potassium hydroxide concentration should not exceed 7% otherwise the binder will lose its binding capability. The binder is insoluble in the potassium hydroxide at concentrations less than 7%. The cathode may also include a surfactant. The surfactants will need to be compatible with the binder so as to not adversely affect the binding capability. Examples of suitable surfactants include but are not limited to anionic surfactants, amphoteric surfactants, and combinations thereof.

One non-limiting example of suitable surfactants can include a diphenyl sulfonate or derivative thereof. In one embodiment, the surfactant comprises an anionic diphenyl sulfonate surfactant or a hydrocarbyl substituted derivative thereof where the hydrocarbyl group contains 1 to about 24 and preferably 1 to about 12 carbon atoms. Specific examples include alkali metal alkyl diphenyl oxide disulfonates such as sodium hexyldiphenyioxide disulfonate, sodium decyldiphenyloxide disulfonate, dodecyldiphenyloxide disulfonic acid, sodium dodecyldiphenyloxide disulfonate, N-decyldiphenyloxide disulfonate, sodium n-decyldiphenyloxide disulfonate and sodium n-hexadecyldiphenyloxide disulfonate. Diphenylsulfonate surfactants are commercially available from Dow under the general trade designation "Dowfax," and specifically include Dowfax C6L, C10L, 2AO, 2A1, 2A1 -D, 2EP, 3BO, 3B2, 3B2-D, 2000, 8390, and 8390-D.

Examples of anionic surfactants are chlorine bleach stable, alkali soluble surfactants. In one embodiment the anionic surfactants are not soluble above 5% KOH, or not soluble in 30% KOH.

Suitable diphenyl sulfonate surfactants can have the general structure as shown below where the R leaving group can be varied. Examples of different leaving groups include: Dowfax C6L has R=Linear Hexyl(C6); DowFax 3B2 has R=Linear Decyl(C10); DowFax C10L has R=Linear Decyl (C10), higher sulfonation; DowFax 2A1 has R=Linear dodecyl (C12); and DowFax 8390 has R=Linear hexadecyl(C16).

Another non-limiting example of a suitable surfactant includes an amphoteric surfactant. The term "amphoteric" as used herein, means a compound which exhibits cationic behaviour at low pH and anionic behaviour at high pH. At intermediate pH, called the isoelectric point, the compound bears both positive and negative charges i.e. it is a dipolar ion. In one embodiment, the amphoteric surfactants used herein are soluble in 30% KOH solution but demonstrate little to no surface activity in such a solution.

In one example, the amphoteric surfactant has the general formula of:

Wherein R=C16, C12, or 2-ethylhexyl. Non-limiting examples of commercially available amphoteric surfactants include: Amphoteric LH, Amphoteric 16, Amphoteric 12, and Amphoteric 400, all commercially available from Air Products.

The cathode may also include combinations of other polymers and binders.

The mixture 155 is extruded continuously 160 into a cathode 165. The extruder may be a single screw, twin screw or other variety extruder. The extruder can be outfitted with a vacuum chamber to de-aerate the mixture helping to densify the mixture before it exits the extruder die. The porosity of the extruded cathode 165 can be adjusted by retaining air, reducing extrusion pressure, adding more water and other methods.

Water is removed 170 from the cathode 165. Water may be removed by heating the cathode. The heating may be conductive or convective or combinations thereof. Preferably, the cathode is heated in a dryer. The cathode may be heated in a dryer at a temperature between about 30° C. and 500° C. Preferably, at least 50% by weight of the water is removed from the cathode. Water may he removed from the cathode by other techniques including but not limited to evaporation and sublimation.

The cathode 165 is cut 180 to form individual cathodes 185. The cathode 165 may be cut prior to removing the water, after removing the water or both. The cathode 165 may be cut to a first length prior to removing the water and cut to a final length after the water has been removed.

The ratio of electrochemically active cathode material 110 to graphite 120 ranges from 99:1 to 90:10. The ratio of electrochemically active cathode material 110 and graphite 120 to aqueous binder 140 ranges from 99.5:0.5 to 97:3. The ratio of electrochemically active cathode material 110, graphite 120, and aqueous binder 140 to water 130 ranges from 89:10.5 to 80:20.

The amount of electrochemically active cathode material within the cathode may be referred to as the cathode loading. The loading of the cathode may vary depending upon the electrochemically active cathode material used within, and the cell size of, the battery. For example, AA batteries with a manganese dioxide electrochemically active cathode material may have a cathode loading of at least 10.0 grams of manganese dioxide. The cathode loading may be, for example, at least about 10.5 grams of manganese dioxide. The cathode loading may be, for example, between about 10.7 grams and about 11.5 grams of manganese dioxide. The cathode loading may be from about 10.7 grams and about 11.0 grams of manganese dioxide. The cathode loading may be from about 10.8 grams and about 11.2 grams of manganese dioxide. The cathode loading may be from about 10.9 grams and about 11.5 grams of manganese dioxide. For a AAA battery, the cathode loading may be from about 4.0 grams and about 6.0 grams of manganese dioxide. For a AAAA battery, the cathode loading may be from about 2.0 grams and about 3.0 grams of manganese dioxide. For a C battery, the cathode loading may be from about 25.0 grams and about 29.0 grams of manganese dioxide. For a D battery, the cathode loading may be from about 54.0 grams and about 70.0 grams of manganese dioxide.

The extruded cathode will have a sufficient dry density to enable good conductivity. The cathode dry density is preferably between about 2.0 g/cm$^2$ and 3.5 g/cm$^2$, more preferably between about 2.4 g/cm$^2$ and 3.3 g/cm2.

The cathode will have sufficient integrity to withstand the handling and insertion into a can. The cathode integrity may defined by the cathodes dry bending strength. The cathode dry bending strength is preferably at least about 0.5 N/mm$^2$ and more preferably at least about 1.0 N/mm$^2$ and most preferably at least about 1.5 N/mm$^2$.

Ideally the cathode will experience relatively minimal shrinkage between extrusion and drying. The amount of linear cathode shrinkage is preferably less than about 5.0%. The amount of cross-sectional cathode shrinkage is preferably less than about 5.0%.

The cathode may have any of the cross-sectional configurations shown in FIG. 3.

The cathode 185 is inserted into a can 200. The can may be made of any conventional type of material commonly used in primary alkaline batteries and can be made of any suitable material, such as, e.g., nickel-plated cold-rolled steel or plastic. The can preferable includes a seal. The seal may be made of, for example, a polyamide (Nylon). The can may have a conventional cylindrical shape—or may have any other suitable non-cylindrical, e.g., prismatic, shape. Interior walls of the can may be treated with a material that has low electrical-contact resistance to an electrode. The interior walls of the can may be plated, e.g., with nickel, cobalt, or painted with a carbon-loaded paint.

A separator is inserted in the can 210. The separator may comprise woven or nonwoven paper or fabric. The separator may include a layer of, for example, cellophane combined with a layer of non-woven material. The separator also can include an additional layer of non-woven material. The separator material may be thin. The separator, for example, may have a dry thickness of less than 150 micrometers (microns). The separator, for example, may have a dry thickness of less than 100 microns. The separator preferably has a dry thickness from about 70 microns to about 90 microns, more preferably from about 70 microns to about 75 microns. The separator has a basis weight of 40 g/m$^2$ or less.

The separator preferably has a basis weight from about, 15 g/m² to about 40 g/m², and more preferably from about 20 g/m² to about 30 g/m².

A current collector is inserted in the can 220. The current collector may be made of metal, e.g., zinc, copper, brass, or any other suitable material. The current collector may be optionally plated with tin, zinc, bismuth, indium, or another suitable material presenting a low electrical-contact resistance between the current collector and, for example, the anode.

An anode is inserted in the can 230. The anode can be formed of at least one electrochemically active anode material, a gelling agent, and minor amounts of additives, such as gassing inhibitor. The electrochemically active anode material may include zinc; cadmium; iron; metal hydride, such as $AB_5$, $AB_2$, and $A_2B_7$; alloys thereof; and mixtures thereof.

The amount of electrochemically active anode material within the anode may be referred to as the anode loading. The loading of the anode may vary depending upon the electrochemically active anode material used within, and the cell size of, the battery. For example, AA batteries with a zinc electrochemically active anode material may have an anode loading of at least about 3.3 grams of zinc. The anode loading may be, for example, at least about 4.0, about 4.3, about 4.6 grams, about 5.0 grams, or about 5.5 grams of zinc. AAA batteries, for example, with a zinc electrochemically active anode material may have an anode loading of at least about 1.9 grams of zinc. For example, the anode loading may have at least about 2.0 or about 2.1 grams of zinc. AAAA batteries, for example, with a zinc electrochemically active anode material may have an anode loading of at least about 0.6 grams of zinc. For example, the anode loading may have at least about 0.7 to about 1.0 grams of zinc. C batteries, for example, with a zinc electrochemically active anode material may have an anode loading of at least about 9.5 grams of zinc. For example, the anode loading may have at least about 10.0 to about 15.0 grams of zinc. D batteries, for example, with a zinc electrochemically active anode material may have an anode loading of at least about 19.5 grams of zinc. For example, the anode loading may have at least about 20.0 to about 30.0 grams of zinc.

Examples of a gelling agent that may be used include a polyacrylic acid; a grafted starch material; a salt of a polyacrylic acid; a carboxymethylcellulose; a salt of a carboxymethylcellulose (e.g., sodium carboxymethylcellulose); or combinations thereof. The anode may include a gassing inhibitor that may include an inorganic material, such as bismuth, tin, or indium. Alternatively, the gassing inhibitor can include an organic compound, such as a phosphate ester, an ionic surfactant or a nonionic surfactant.

An electrolyte is inserted in the can 240. The electrolyte may be dispersed throughout the cathode, the anode and the separator. The electrolyte comprises an ionically conductive component in an aqueous solution. The ionically conductive component may be a hydroxide. The hydroxide may be, for example, sodium hydroxide, potassium hydroxide, lithium hydroxide, cesium hydroxide, and mixtures thereof. The ionically conductive component may also include a salt. The salt may be, for example, zinc chloride, ammonium chloride, magnesium perchlorate, magnesium bromide, and mixtures thereof. The concentration of the ionically conductive component may be selected depending on the battery design and its desired performance. An aqueous alkaline electrolyte may include a hydroxide, as the ionically conductive component, in a solution with water. The concentration of the hydroxide within the electrolyte may be from about 0.25 to about 0.35, or from about 25% to about 35%, on a total weight basis of the electrolyte. For example, the hydroxide concentration of the electrolyte may be from about 0.25 to about 0.32, or from about 25% to about 32%, on a total weight basis of the electrolyte.

The concentration of the ionically conductive component may be determined by collecting the total amount of electrolyte from within an assembled alkaline cell, for example a AA or a AAA alkaline cell. Removing the separator, cathode, and anode components and dissolving these components within a hydrochloric solution may generally accomplish this. Hydrogen peroxide may be added in a drop-wise manner to aid in the dissolving process. The dissolved solution may then be diluted to a specific volume to provide an analyte. The analyte may then be analyzed via an inductively coupled plasma (ICP) emission spectrometer, such as a JY Ultratrace or its equivalent, to determine the total positive ion concentration of the ionically conductive component within the analyte, for example potassium ($K^+$) concentration in ppm. The total positive ion concentration determined via ICP from the analyte may be used to mathematically determine the total weight of the positive ion, for example potassium ($K^+$) in grams, and subsequently the total weight of ionically conductive component, for example potassium hydroxide (KOH) in grams, within the electrolyte solution of the sampled alkaline cell. The concentration of the ionically conductive component of the electrolyte, for example potassium hydroxide (KOH), on a weight basis of the electrolyte may be determined by dividing the total weight of the ionically conductive component by the analyte weight.

The aqueous alkaline electrolyte may also include zinc oxide (ZnO). The ZnO may serve to suppress zinc corrosion within the anode. The concentration of ZnO included within the electrolyte may be less than about 3% by weight of the electrolyte. The ZnO concentration, for example, may be less than about 2% by weight of the electrolyte.

The total weight of the aqueous alkaline electrolyte within a AA alkaline battery, for example, may be from about 3.0 grams to about 4.0 grams. The weight of the electrolyte within a AA battery preferably may be, for example, from about 3.3 grams to about 3.8 grams. The weight of the electrolyte within a AA battery may more preferably, for example, from about 3.4 grams to about 3.6 grams. The total weight of the aqueous alkaline electrolyte within a AAA alkaline battery, for example, may be from about 1.0 grams to about 2.0 grams. The weight of the electrolyte within a AAA battery preferably may be, for example, from about 1.2 grams to about 1.8 grams. The weight of the electrolyte within a AA battery may more preferably, for example, from about 1.4 grams to about 1.6 grams.

The can is sealed 250.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a battery cathode, comprising:
   mixing electrochemically active cathode material, graphite, water and an aqueous based binder to provide a mixture;
   extruding the mixture continuously into a cathode;
   removing water from the cathode; and
   cutting the cathode into individual cathodes, wherein the aqueous based binder is present in amount of less than 3%.

2. The method of claim 1 wherein the water is removed by heating the cathode.

3. The method of claim 2 wherein the water is removed by heating the cathode between about 20 C. and 500° C.

4. The method of claim 2 wherein at least 50% by weight of the water is removed from the cathode by heating.

5. The method of claim 1 wherein the electrochemically active cathode material is selected from the group consisting of manganese oxide, manganese dioxide, electrolytic manganese dioxide (EMD), chemical manganese dioxide (CMD), high power electrolytic manganese dioxide (HP EMD), lambda manganese dioxide, and mixtures thereof.

6. The method of claim 1 wherein the aqueous based binder comprises hydroxypropylethylcellulose.

7. The method of claim 1 wherein the cathode has a cross-sectional configuration selected from the group consisting of circular, semicircular, star, multi-lobed, crescent, pie, partial ring and annulus.

8. The method of claim 1 wherein the cathode is extruded in at least two longitudinal pieces which are combined to form the equivalent of one longitudinally extruded cathode.

9. The method of claim 1 wherein the cathode further comprises potassium hydroxide.

10. The method of claim 9 wherein the binder is insoluble in the potassium hydroxide at potassium hydroxide concentrations less than 7%.

11. The method of claim 1 wherein the cathode further comprises a surfactant.

12. The method of claim 1 wherein the binder has a swelling of no more than 10% in water.

13. The method of claim 1 wherein the linear cathode shrinkage is less than 5.0%.

14. The method of claim 1 wherein the cross-sectional cathode shrinkage is less than 5.0%.

15. The method of claim 1 wherein the mixture has at least one peak from 20 Nm to 200 Nm at a time between 1 second and 10 seconds.

16. The method of claim 1 further comprising a conditioning step wherein the mixture is extruded prior to extruding the mixture into a cathode.

17. The method of claim 1 wherein the cathode has a dry bending strength of at least 0.5 N/mm$^2$.

18. A method of making a battery, comprising:
   i) making a cathode by:
      a) mixing electrochemically active cathode material, graphite, water and an aqueous based binder to provide a mixture;
      b) extruding the mixture into a cathode;
      c) removing water from the cathode,
      d) cutting the cathode into individual cathodes, wherein the aqueous based binder is present in amount of less than 3%;
   ii) inserting the cathode in a can;
   iii) inserting a separator in the can;
   iv) inserting a current collector in the can;
   v) inserting an anode in the can;
   vi) inserting an electrolyte in the can; and
   vii) sealing the can.

19. The method of claim 18 wherein the electrochemically active cathode material is selected from the group consisting of manganese oxide, manganese dioxide, electrolytic manganese dioxide (EMD), chemical manganese dioxide (CMD), high power electrolytic manganese dioxide (HP EMD), lambda manages dioxide, and mixtures thereof.

20. A mixture for making a battery cathode comprising EMD, graphite, and an aqueous binder and optionally comprising surfactants, electrolytes and additional binders wherein the mixture is characterized by a plastogram having at least one torque peak ranging from 20 to 80 Nm and a second peak occurring in time after the first peak ranging from 20 to 160 Nm.

21. The method of claim 1, wherein the extruded cathode is not affixed onto a support substrate during the extruding, removing water, and cutting steps.

22. The method of claim 18, wherein the extruded cathode is not affixed onto a support substrate during the extruding, removing water, and cutting steps.

* * * * *